July 13, 1926. 1,592,068
H. C. BENNETT
STEERING DEVICE FOR VEHICLES
Filed July 29, 1922
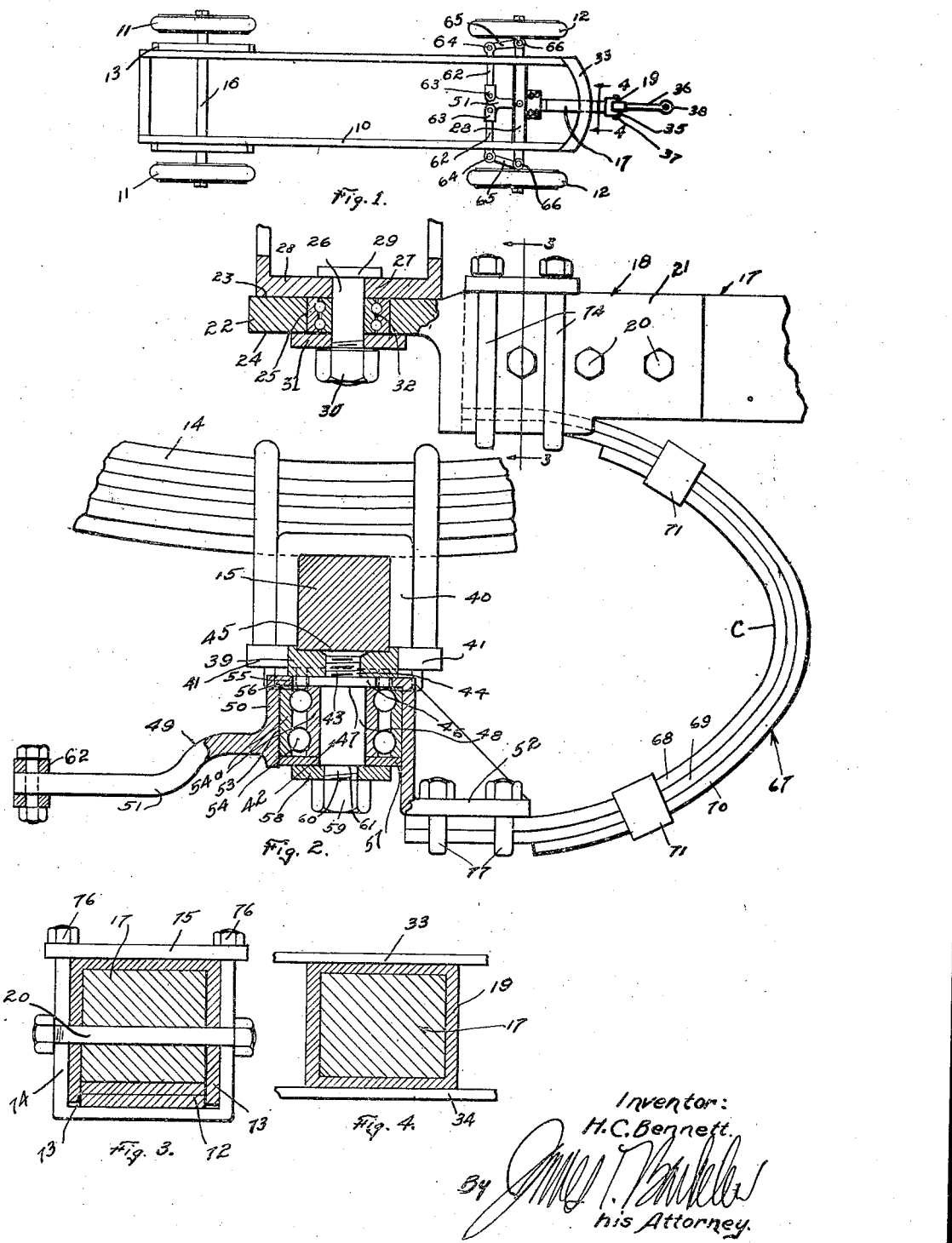
Inventor:
H. C. Bennett.
By
his Attorney.

Patented July 13, 1926.

1,592,068

UNITED STATES PATENT OFFICE.

HAROLD C. BENNETT, OF LOS ANGELES, CALIFORNIA, ASSIGNOR TO UTILITY TRAILER MANUFACTURING COMPANY, A CORPORATION OF CALIFORNIA.

STEERING DEVICE FOR VEHICLES.

Application filed July 29, 1922. Serial No. 578,449.

This invention relates to steering devices for vehicles, and is particularly applicable to vehicles, such as trailers and the like, adapted to be towed by draft vehicles.

The foremost object of my invention is the provision of means, in connection with a pivotally monted draw-bar, to transmit the steering movements of the draw-bar to the dirigible wheels of the vehicle; which means forms a rigid and positive connection between the draw bar and dirigible wheels, and yet has yielding qualities to permit and compensate for variations in distance between the vehicle frame, to which the draw-bar is attached and the vehicle axle, to which the vehicle steering connections are attached.

My invention is further characterized by its extreme simplicity, durability of construction, and economy of manufacture; together with its efficiency in operation. Its merits and details of construction will be more fully set forth in the following specification, reference being made therein to the accompanying drawings, illustrating the preferred specific form, and in which:

Fig. 1 is a plan view of the chassis of a trailer, showing my invention as attached thereto; Fig. 2 is an enlarged fragmentary side elevation of the invention, parts being shown in section to clearly show its construction; Fig. 3 is a transverse vertical section, taken as indicated by the lines 3—3 of Fig. 2; and Fig. 4 is a transverse vertical section taken as illustrated by the line 4—4 of Fig. 1.

Referring to the drawings the numeral 10 designates the frame of the trailer supported upon rear wheels 11 and dirigible wheels 12, by means of rear springs 13 and front springs 14, these springs being supported upon suitable axles, the front axle being designated by the numeral 15 and the rear axle 16.

A draw bar, generally designated by the numeral 17, is preferably constructed of suitable wood, such as hickory or oak, having each of its ends extended into fittings 18 and 19, and rigidly secured therein, by means of bolts 20.

The fitting 18 is constructed of a suitable metal and consists of a socket portion 21, substantially square in cross sectional configuration, for receiving the bar 17 and having a bearing portion 22 extending outwardly from its rear end. The bearing portion 22 is substantially flat, having top and bottom bearing faces 23 and 24, respectively; and having a central circular aperture 25 through which a bolt or pin 26 extends. The pin 26 extends through an aperture 27, in a transverse member 28 of the frame 10; a head 29 supporting the bolt 26 in the aperture 27 and a nut 30 and washer 31 being adjusted to its opposite end to hold the top face 23, of the bearing member 22, in engagement with the bottom face of the frame member 28. Preferably the aperture 25 is made sufficiently large in diameter to permit the introduction of ball bearings 32 thereinto and around the bolt 26; the principal function of these ball-bearings being to take up transverse thrust of the bearing member 22 against the bolt 26, when the frame 10 is moved vertically relative to the axle 15, the cause of which will be more fully hereinafter explained.

The draw bar member 17 extends outwardly between two parallel arcuate guide and supporting members 33 and 34, and the fitting 19 secured to its outer end. The guide members 33 and 34 are carried by the longitudinal side members of the frame 10 and support the draw bar in substantially horizontal position and allowing it free lateral swinging movement about its center upon the pin 26. The fitting 19 may be in the form of a casting, or the like, having a bifurcated end 35 for the reception of one end of a connecting link 36, which may be held in place by means of a horizontal pin 37 that allows ink 36 to swing vertically. The link 36 may be provided at its opposite end with an eye 38 to facilitate its attachment to the towing vehicle.

A plate 39 is rigidly secured to the bottom face of the axle 15—which is preferably made square for the purpose—by means of U-bolts 40 extending around this axle and through ears or lugs 41, suitably formed on each end of the plate 39. A stud or pivot pin 42 has a reduced end 43 screw-threadedly engaging in a central bore 44, in the plate 39; the top end of the reduced portion 43 being then peaned over, as at 45, to securely hold it in place. A disk or washer 46 surrounds the reduced portion 43 and is confined between a shoulder 47, on the pin 42, and the bottom face of the plate 39. This washer 46 is of a diameter to extend a short distance beyond the periphery of the enlarged portion 48 of the pin 42, the purpose of which will be later explained.

A fitting 49 having a central inverted, cylindrical, cup-shaped bearing portion 50 and arms 51 and 52, extending radially outward from opposite sides thereof, is adapted to be rotatably mounted upon the stud 42. The central opening 53, in the bearing portion 50, is cylindrical and of a diameter somewhat greater than the diameter of the stud 42 to permit the introduction of ball-bearings 54 therebetween, as clearly illustrated in Fig. 2. The ball-bearings 54 are also to take up side thrust between the bearing portion 50 and the stud 42, as in the case of the bearing portion 22 and bolt 26, during vertical motion of the frame 10 relative to the axle 15. And while I have illustrated the use of ball-bearings in each instance, it is to be understood that any suitable type of antifriction bearings may be utilized.

A circular aperture 55 is cut in the top 56 of the bearing portion 50, to extend around the stud 42; and this forms an annular flange extending inwardly from the sides of this bearing portion; the outer face of which is adapted to slidably engage the bottom face of the plate 39. Also the shoulder formed by the inner face of this flange, together with the portion of the disk 46 extending beyond the periphery of the stud 42, form stops against which the ball-races 54ª abut.

The ball races 54ª are securely held in place against the aforementioned shoulders by means of a disk or washer 57, surrounding the stud 42 and held in place by means of a second washer 58 and nut 59 adjusted to the outer reduced end 60, of the stud 42. Washers 46 and 58 abutting against the shoulders 47 and 61, formed on the stud 42, prevent undue binding action on the ball races 54ª, by tightening of the nut 59.

The arm 51, which is preferably formed integral with the bearing portion 50, extends rearwardly therefrom, and is connected by means of links 62, pivoted at 63 and 64 to steering arms 56 of the front steering knuckles 66. Thus by oscillation of the arm 51 about the stud 42 steering motion will be transmitted to the front wheels 12 of the vehicle.

In order that steering motion will be transmitted from the draw bar 17 to the fitting 49, and thence to the dirigible wheels 12, the pivot pin 26 is situated above and in axial alignment with the pivot stud 42. The draw bar 17 is operatively connected with the fitting 49, to transmit this steering motion, through the medium of a yielding U-shaped connection, generally designated by the numeral 67. This connection is preferably formed of a plurality of flat leaf spring members 68, 69 and 70, relatively movably bound together intermediate their ends by means of suitable shackles 71. Any number of spring leaves may be used for the purpose, and in the present instance I have shown it to be formed of three, which clearly illustrate its principle of construction.

The bottom face of fitting 18 is recessed, as at 72, (see Fig. 3) forming side walls or flanges 73; into which recess one end of the yielding connection 67 is introduced and rigidly held in place by means of U-bolts 74. The free ends of the U-bolts 74 extend through a plate 75, engaging the top face of fitting 18 and receive nuts 76. The opposite end of the connection 67 is rigidly secured to the bottom face of the bracket arm 52 by means of U-bolts 77. In each instance the U bolts 74 and 77 clamp the ends of the members 67 to form rigid and unyielding connections and to obviate possibility of any loose or wearing motion between these connecting parts.

Preferably, in attaching the member 67 to the fittings 18 and 49, the central leaf 69 is secured with the leaf 68 to one of these fittings, at one end, and with the leaf 70 to the other fitting at the other end. The leaves 68 and 70 are then terminated a short distance from the connection opposite that to which they are attached, and these free ends held in proper engagement with the other leaves by means of the shackles 71. Preferably the connection 67 will be made semielliptical, in configuration, as shown; but if found desirable it may be made semicircular with equally successful results.

Thus I have produced a yielding connection for transmitting steering motion from the draw bar 17 to the dirigible wheels 12, of the vehicle, through the described connecting media, which will permit a variation in distance between the frame member 28 and the axle 15, resulting from yielding action of the vehicle springs 13 and 14, and at the same time such connection will be rigid and unyielding in so far as its mounting upon the vehicle and its steering function is concerned. It is obvious that during vertical movement of the frame member 28, and consequently the draw-bar 17, relative to the axle, the yielding action or bending of the member 67 will take place in the region of its center, designated by the letter C, which action is made possible by the manner of constructing this member, and more or less by the particular manner of arranging and adjusting the spring leaves comprising this member. It is obvious that the horizontal oscillation of the draw bar 17 about its pivotal point 26 will be transmitted to the fitting 49 by means of the fitting 67, as hereinbefore described.

While I have shown and described the preferred specific embodiment of my invention, I nevertheless reserve the right to make such changes or modifications in structure as will properly come within the scope of the appended claims.

I claim:

1. The combination with a vehicle having dirigible wheels and steering means in connection therewith, of a draw bar pivotally connected to the vehicle frame, and a resilient U-shaped member rigidly connected at one end to the draw bar and at its other end to the steering means, said member being composed of a central spring leaf connected to both the draw bar and the steering means, and outside spring leaves on opposite sides of the central leaf and one of which is connected at one end with the draw bar and the other at the opposite end with the steering means.

2. The combination with a vehicle having dirigible wheels and steering means in connection therewith, of a draw bar pivotally connected to the vehicle frame, and a member adapted to transmit steering motion from the draw bar to said steering means, said member consisting of a resilient U-shaped member rigidly secured at one end to the draw bar and at its other end to said steering means, and being composed of a plurality of leaf spring members, one of which is joined at both its ends to said members and the others of which are joined to said members only at one of their ends.

3. The combination with a vehicle having dirigible wheels and steering means in connection therewith, of a draw bar pivotally connected to the vehicle frame, and a member adapted to transmit steering motion from the draw bar to said steering means, said member consisting of a resilient U-shaped member rigidly secured at one end to the draw bar and at its other end to said steering means, and being composed of three leaf spring members, the center one of which is secured at both its ends to said draw bar and steering means, one of the others being secured at only one end to the draw bar and the other at only one end to the steering means, the free ends of said last mentioned members being relatively movably held in contact with the center member.

4. The combination with a vehicle having dirigible wheels and steering gear in connection therewith, of a draw bar above the steering gear pivotally connected with the vehicle frame to swing horizontally relatively thereto, and a U-shaped spring arranged with its end portions substantially horizontally, one end rigidly affixed to the steering gear and the other rigidly affixed to the draw bar at a point above the point of connection to the steering gear, said U-shaped spring being relatively flat in section and with its longer sectional axis transverse of the plane of the U-shaped spring throughout its length, so that the spring is relatively flexible in its plane and relatively stiff against bending transversely of its plane.

In witness that I claim the foregoing I have hereunto subscribed my name this 22nd day of July 1923.

HAROLD C. BENNETT.